(12) United States Patent
Hsiao

(10) Patent No.: US 11,503,259 B2
(45) Date of Patent: Nov. 15, 2022

(54) PROJECTOR CALIBRATION METHOD AND PROJECTION SYSTEM USING THE SAME

(71) Applicant: Coretronic Corporation, Hsin-Chu (TW)

(72) Inventor: Pei-Chi Hsiao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/524,143

(22) Filed: Jul. 28, 2019

(65) Prior Publication Data
US 2020/0045276 A1 Feb. 6, 2020

(30) Foreign Application Priority Data

Jul. 31, 2018 (CN) .......................... 201810856422.7

(51) Int. Cl.
*H04N 9/31* (2006.01)
*G06T 7/73* (2017.01)

(52) U.S. Cl.
CPC ............ *H04N 9/3185* (2013.01); *G06T 7/73* (2017.01); *H04N 9/3182* (2013.01)

(58) Field of Classification Search
CPC .. H04N 9/3185; H04N 9/3182; H04N 9/3147; H04N 9/3194; H04N 9/3179; G06T 7/73; G06T 3/005; G06T 7/74; G06T 7/75; G03B 21/54
See application file for complete search history.

(56) References Cited

U.S. PATENT DOCUMENTS

| 6,327,020 | B1 | 12/2001 | Iwata | |
| 6,456,339 | B1 * | 9/2002 | Surati | .................... G03B 37/04 348/744 |
| 7,293,881 | B2 | 11/2007 | Kasahara | |

(Continued)

FOREIGN PATENT DOCUMENTS

| CN | 105376540 | 3/2016 |
| CN | 108076331 | 5/2018 |

OTHER PUBLICATIONS

Fulldome, "Fulldome Pro", retrieved on Jul. 10, 2018, https://fulldome.pro/.

(Continued)

*Primary Examiner* — John W Miller
*Assistant Examiner* — Humam M Satti
(74) *Attorney, Agent, or Firm* — JCIPRNET

(57) ABSTRACT

The invention provides a projector calibration method for forming a spherical target image at a viewing point. The projector calibration method includes the following steps. A first preset image is projected by a first projector to a dome screen, and a first deformed image is obtained by capturing an image of the dome screen using a first camera. A spatial relationship between the first projector, the first camera, and the dome screen is calculated according to the first preset image and the first deformed image. A first prewarp image is generated according to a target image, a spatial relationship between the first projector and the dome screen, and a spatial relationship between the dome screen and the viewing point. Projection is performed by the first projector according to the first prewarp image. In addition, a projection system using the method is also provided.

21 Claims, 13 Drawing Sheets

(56) References Cited

U.S. PATENT DOCUMENTS

| | | | |
|---|---|---|---|
| 8,646,918 B2 | 2/2014 | De Paor | |
| 2004/0169827 A1 | 9/2004 | Kubo et al. | |
| 2006/0209268 A1* | 9/2006 | Raskar | H04N 5/74 353/69 |
| 2008/0136976 A1* | 6/2008 | Ajito | H04N 9/3185 348/745 |
| 2008/0204666 A1 | 8/2008 | Spearman | |
| 2008/0285843 A1* | 11/2008 | Lim | G06K 9/209 382/154 |
| 2009/0268095 A1* | 10/2009 | Hoshino | H04N 5/74 704/275 |
| 2010/0141780 A1* | 6/2010 | Tan | H04N 9/3185 348/222.1 |
| 2011/0019108 A1 | 1/2011 | Nelson et al. | |
| 2011/0242332 A1 | 10/2011 | McFadyen et al. | |
| 2012/0057807 A1 | 3/2012 | Jaynes et al. | |
| 2013/0070094 A1* | 3/2013 | Majumder | G03B 37/04 348/143 |
| 2015/0288951 A1* | 10/2015 | Mallet | H04N 17/002 348/46 |
| 2017/0070711 A1* | 3/2017 | Grundhofer | H04N 9/3182 |
| 2017/0127029 A1 | 5/2017 | Green et al. | |
| 2017/0257576 A1* | 9/2017 | Mitsui | H04N 5/23293 |
| 2018/0139424 A1* | 5/2018 | Urquhart | H04N 9/3147 |
| 2018/0365815 A1* | 12/2018 | Dorbie | G02B 27/017 |

OTHER PUBLICATIONS

Opencv, "Open Source Computer Vision Library", retrieved on Jul. 10, 2018, https://opencv.org/.

Gabriel Falcao et al, "Projector-Camera Calibration Toolbox", retrieved on Jul. 10, 2018, https://code.google.com/archive/p/procamcalib/.

Daniel Moreno et al, "Simple, Accurate, and Robust Projector-Camera Calibration", 2012 Second Joint 3DIM/3DPVT Conference: 3D Imaging, Modeling, Processing, Visualization & Transmission, Oct. 2012, pp. 1-9.

Richard Hartley et al, "Multiple View Geometry in Computer Vision", Cambridge University Press, 2nd edition, 2003, pp. 1-669.

Richard Hartley et al, "Triangulation", Computer Vision and Image Understanding, vol. 68, Issue. 2, Nov. 1997, pp. 1-21.

Qian Zhou et al., "Automatic Calibration of a Multiple-Projector Spherical Fish Tank VR Display," 2017 IEEE Winter Conference on Applications of Computer Vision (WACV), Mar. 24-31, 2017, pp. 1072-1081.

"Search Report of Europe Counterpart Application", dated Jan. 9, 2020, p. 1-p. 19.

"Office Action of China Counterpart Application", dated Mar. 5, 2021, p. 1-p. 8.

* cited by examiner

PROJECTOR CALIBRATION METHOD AND PROJECTION SYSTEM USING THE SAME

CROSS-REFERENCE TO RELATED APPLICATION

This application claims the priority benefit of China application serial no. 201810856422.7, filed on Jul. 31, 2018. The entirety of the above-mentioned patent application is hereby incorporated by reference herein and made a part of this specification.

BACKGROUND OF THE INVENTION

Field of the Invention

The disclosure relates to a projection method, and in particular, to a projector calibration method for dome screen projection and a projection system using the method.

Description of Related Art

The projection stitching/fusion technology for multiple projectors can accommodate the requirements for large screen display, and particularly, can be adapted for projection screens of different geometric shapes (e.g., an arc shape, a spherical surface, a curved surface, a columnar shape, and a large plane) to achieve special projection effects. Among projection screens of various shapes, the spherical projection screen provides greatest coverage, and a viewer can see an image of a high resolution and a wide viewing angle at a specific position and has an immersive virtual reality experience. However, when an image is projected to the spherical projection screen, complex distortion/deformation occurs. Therefore, how to perform calibration in advance becomes an issue of research.

In the current art, the image is prewarped mostly through a hardware device such as a fisheye lens, a convex reflector, an aspherical reflector, or a spherical reflector to allow the viewer to see the undeformed image.

However, the purpose above is achieved by using the hardware device on condition that the relative arrangement of the projector, the projection screen, and the hardware device is fixed. Therefore, in actual applications, it is difficult to expand the number of the projectors, and the position of the projector cannot be arbitrarily changed. As a result, the space that can be used is limited. In addition, the light emitted from the projector is reflected or refracted by the hardware device before it is projected to the projection screen, which decreases the brightness that is eventually presented.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention provides a projector calibration method and a projection system using the method that prevent distortion of an image projected to a dome screen, provide a viewer with excellent viewing quality, and exhibit significant convenience and expandability.

Other purposes and advantages of the invention may be further understood according to the technical features disclosed herein.

To achieve one, part, or all of the purposes above or other purposes, an embodiment of the invention provides a projection system including a first projector, a dome screen, and a processor. The first projector projects a spherical target image. The dome screen receives the spherical target image. The processor is coupled to the first projector and is configured to generate a first prewarp image according to a target image, a spatial relationship between the first projector and the dome screen, and a spatial relationship between the dome screen and a viewing point. The first projector performs projection according to the first prewarp image to form the spherical target image at the viewing point. A distance between a position of the viewing point and a position of a center of sphere of the dome screen is at least greater than or equal to a distance of a sphere radius/tan (fov/2) of the dome screen, where fov is a viewing angle.

To achieve one, part, or all of the purposes above or other purposes, an embodiment of the invention provides a projector calibration method for forming a spherical target image at a viewing point. The projector calibration method includes the following steps. A first preset image is projected by a first projector to a dome screen, and a first deformed image is obtained by capturing an image of the dome screen using a first camera. A spatial relationship between the first projector, the first camera, and the dome screen is calculated according to the first preset image and the first deformed image. A first prewarp image is generated according to a target image, a spatial relationship between the first projector and the dome screen, and a spatial relationship between the dome screen and the viewing point. Projection is performed by the first projector according to the first prewarp image.

Based on the above, the embodiments of the invention at least exhibit one of the advantages or effects below. Regardless of the number of the projectors, without previously learning the displacement and the angle of the projector with respect to the dome screen, the projector calibration method and the projection system using the method provided in the embodiments of the invention can calibrate the projector through the assistance of the camera to allow the viewer to see the undeformed target image, which exhibits significant convenience and expandability. In addition, in the projection system with multiple projectors, the embodiments of the invention further provide the method of calibrating the brightness of each of the projectors. Even if the projection ranges of the projectors overlap, the brightness of the target image can still be maintained, which thereby provides an excellent viewing experience.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

In the embodiments of the invention, a spherical target image to be seen by a viewer is prewarped into a prewarp image, so that after a projector projects the prewarp image to a spherical projection screen (also referred to as a dome screen), the viewer can see an undeformed spherical target image at a viewing point. To achieve the above objective, it is necessary to obtain spatial information such as the relative angle and the amount of displacement between the projector and the dome screen. Therefore, in the embodiments of the invention, a camera is used as an auxiliary device. After the projector projects a preset image to the dome screen, the camera captures the preset image formed on the dome screen to obtain the corresponding deformed image. Based on the preset image and the deformed image, the spatial information between the projector and the dome screen can be calculated. Accordingly, even if the position or the number of the projector is changed, it is only necessary to calculate the spatial information again.

Figure 1A:
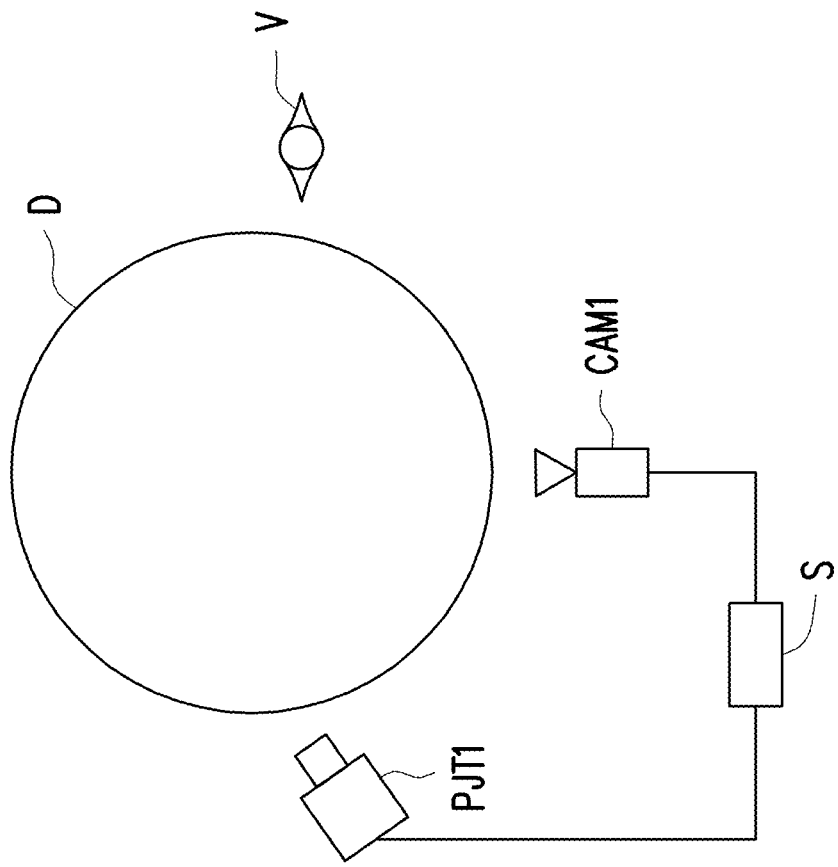
FIG. 1A is a schematic diagram illustrating a projection system according to an embodiment of the invention.
Figure 1A:
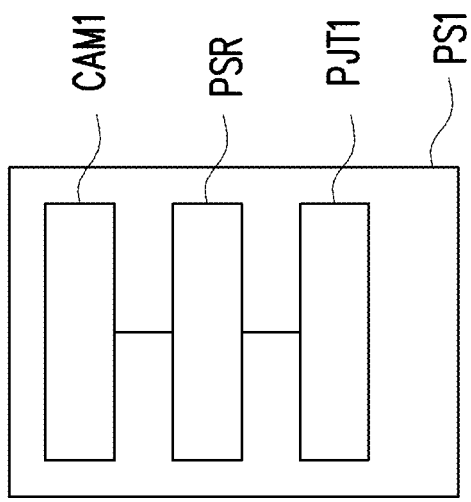

In some embodiments, a projection system uses one projector to project an image. As shown in FIG. 1A, a projection system PS1 includes a first projector PJT1, a first camera CAM1, and a processor PSR. The first projector PJT1 and the first camera CAM1 are both coupled to the processor PSR. In addition, an image output device S is coupled to the first projector PJT1 and the first camera CAM1. The processor PSR may be disposed in the image output device S but is not limited thereto. In other embodiments, the processor PSR may also be disposed in the first projector PJT1. In other embodiments, the first projector PJT1 and the first camera CAM1 may be integrated into a projector with a camera, and the embodiment is not limited to the case where the first projector PJT1 and the first camera CAM1 are two physically separated devices. The image output device S is configured to provide images to the first projector PJT1. The first projector PJT1 and the first camera CAM1 are both disposed to correspond to a dome screen D. Namely, when the first projector PJT1 projects an image towards the dome screen D, the first camera CAM1 can capture the deformed image presented on the dome screen D. In addition, an observer may be located at a viewing point v to view the image projected by the first projector PJT1 to the dome screen D, and the invention does not limit the position of the viewing point v here.

Figure 1B:
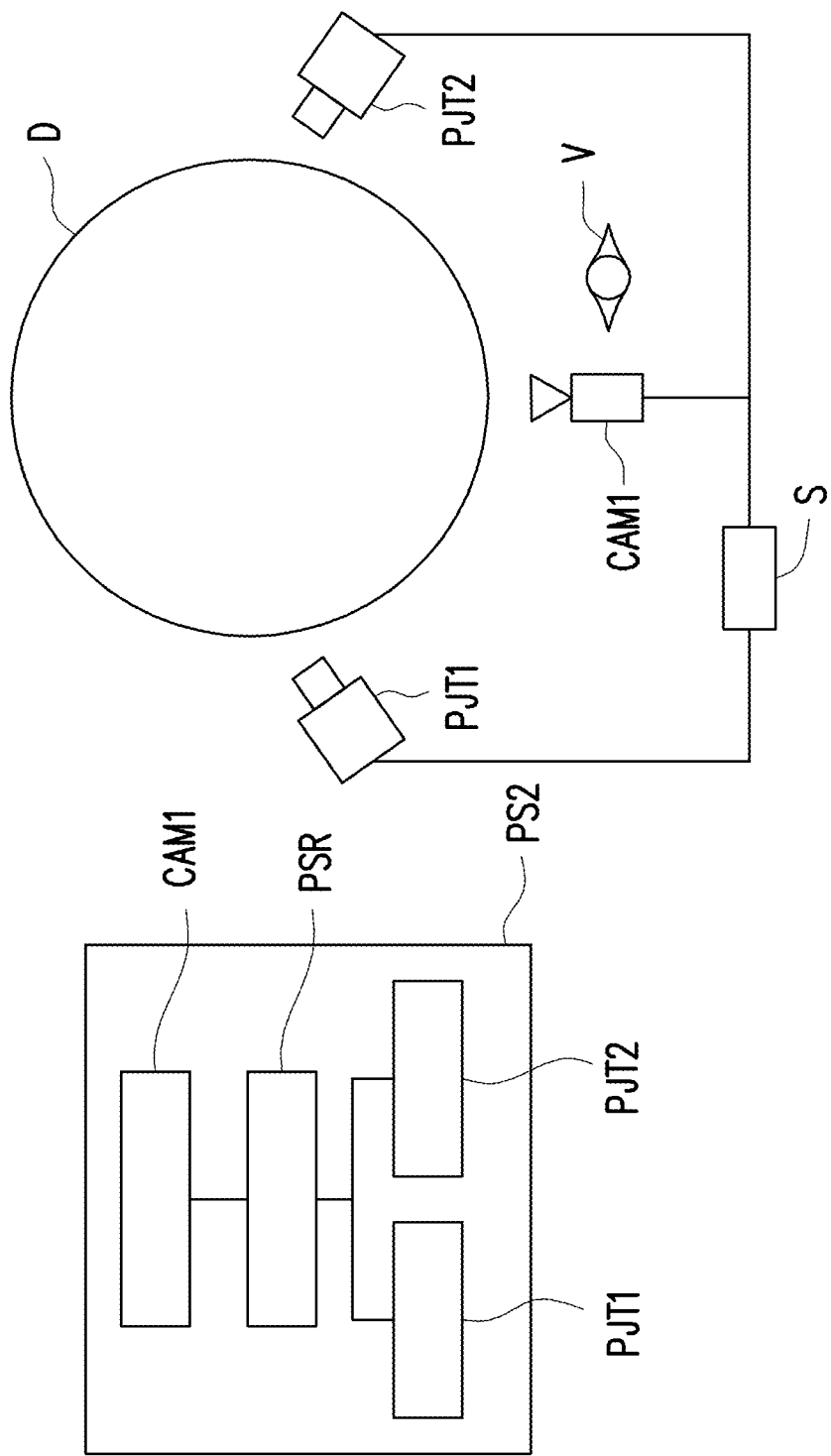
FIG. 1B is a schematic diagram illustrating a projection system according to another embodiment of the invention.

In some embodiments, the projection system uses multiple projectors to project an image. As shown in FIG. 1B, the projection system PS2 includes a first projector PJT1, a second projector PJT2, a first camera CAM1, and a processor PSR. The first projector PJT1, the second projector PJT2, and the first camera CAM1 are all coupled to the processor PSR. In addition, an image output device S is coupled to the first projector PJT1, the second projector PJT2, and the first camera CAM1. The processor PSR may be disposed in the image output device S but is not limited thereto. In other embodiments, the processor PSR may also be disposed in the first projector PJT1 or the second projector PJT2. In other embodiments, the first projector PJT1 and the first camera CAM1 may be integrated into a projector with a camera, and the embodiment is not limited to the case where the first projector PJT1 and the first camera CAM1 are two physically separated devices. The image output device S is configured to provide images to the first projector PJT1 and the second projector PJT2. The first projector PJT1, the second projector PJT2, and the first camera CAM1 are all disposed to correspond to a dome screen D. When the first projector PJT1 and the second projector PJT2 collectively project an image to the dome screen D, the first camera CAM1 can capture the deformed image presented on the dome screen D. In addition, an observer may be located at a viewing point v to view a stitched image projected by the first projector PJT1 and the second projector PJT2 to the dome screen D, and the invention does not limit the position of the viewing point v here.

Figure 1C:
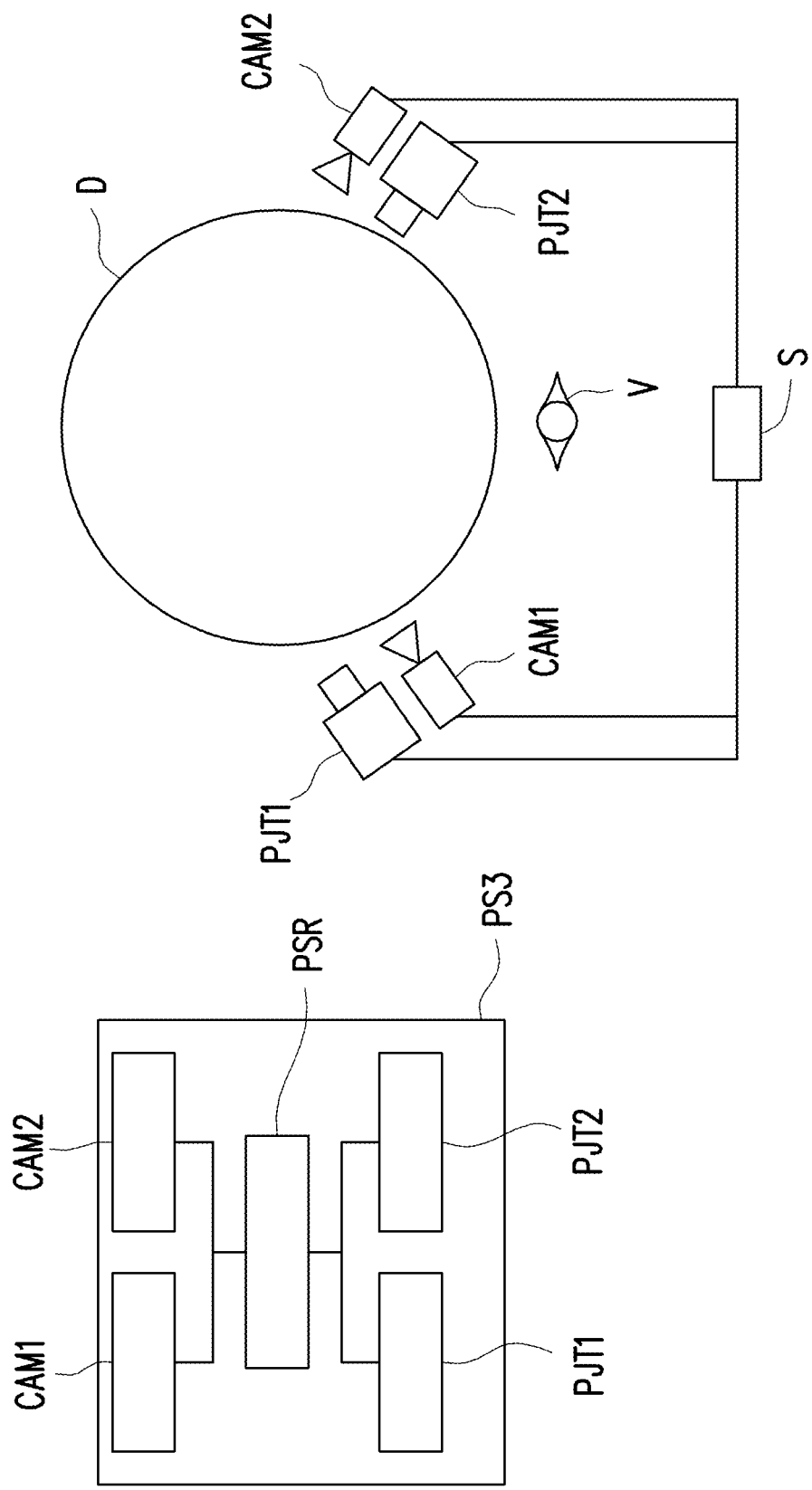
FIG. 1C is a schematic diagram illustrating a projection system according to still another embodiment of the invention.

In some embodiments, when the projection system uses multiple projectors to project an image, the field of view of one camera may not be able to cover the total projection range of the multiple projectors. Therefore, one camera is disposed to correspond to each projector. As shown in FIG. 1C, a projection system PS3 includes a first projector PJT1, a second projector PJT2, a first camera CAM1, a second camera CAM2, and a processor PSR. The first projector PJT1, the second projector PJT2, the first camera CAM1, and the second camera CAM2 are all coupled to the processor PSR. In addition, an image output device S is coupled to the first projector PJT1, the second projector PJT2, the first camera CAM1, and the second camera CAM2. The processor PSR may be disposed in the image output device S but is not limited thereto. In other embodiments, the processor PSR may also be disposed in the first projector PJT1 or the second projector PJT2. In other embodiments, the first projector PJT1 and the first camera CAM1 may be integrated into a projector with a camera, and the second projector PJT2 and the second camera CAM2 may be integrated into a projector with a camera, and the embodiment is not limited to the case where the first projector PJT1 and the first camera CAM1 are two physically separated devices and the second projector PJT2 and the second camera CAM2 are two physically separated devices. The image output device S is configured to provide images to the first projector PJT1 and the second projector PJT2. The first projector PJT1, the second projector PJT2, the first camera CAM1, and the second camera CAM2 are all disposed to correspond to a dome screen D. When the first projector PJT1 projects a first image to the dome screen D, the first camera CAM1 can capture the deformed first image presented on the dome screen D. When the second projector PJT2 projects a second image to the dome screen D, the second camera CAM2 can capture the deformed second image presented on the dome screen D. In addition, an observer may be located at a viewing point v to view a stitched image projected by the first projector PJT1 and the second projector PJT2 to the dome screen D, and the invention does not limit the position of the viewing point v here.

Although the projection system has been described with the above three combinations of the projectors and the cameras, the invention does not limit the numbers of the projectors and the cameras in the projection system here, and the numbers of the two may be the same or different.

In some embodiments, the projector and the camera in the projection system may be implemented, for example, as integrated and packaged as a single projection device, or may be respectively implemented, for example, as separate devices, and the invention is not limited thereto.

It is noted that, in the following description, the imaging principle of the pinhole camera model is applied to the projector and the camera in the embodiments of the invention (namely, the projector and the camera are assumed to be individual pinhole camera models), but the invention is not limited thereto. In other words, both the projector and the camera have intrinsic parameters, including intrinsic projection matrices and lens distortion coefficients. Specifically, the intrinsic projection matrix includes related information of the focal length of the lens and the center coordinates of the image. For example, the form of a projection matrix K is [fx, 0, cx; 0 fy cy; 0 0 1], where fx and fy are the focal length coefficients of the lens, and cx and cy are the image center coefficients. The above calculation can be clearly understood by people skilled in the art and is not repeatedly described here. The lens distortion coefficient includes radial distortion parameters and tangential distortion parameters. In other words, the lens distortion coefficient is a parameter of image distortion/deformation caused by the lens. The image distortion/deformation is, for example, a pincushion distortion image or a barrel distortion image. The intrinsic parameters do not change after the focal length and the zoom level of the projected image are fixed. People skilled in the art can learn about the intrinsic parameters from the pinhole camera model, which shall not be repeatedly described here.

In some embodiments, with the zoom level of the projected image and the focal length of the projector being fixed, for example, the intrinsic parameters of the projector may be obtained by using a projector-camera calibration tool, and with the zoom level of the captured image and the focal length of the camera being fixed, for example, the intrinsic parameters of the camera may be obtained by using a camera calibration tool, and the invention is not limited thereto. Specifically, reference may be made to "Projector-Camera Calibration Toolbox", G. Falcao, N. Hurtos, J. Massich, and D. Fofi, 2009 and "Simple, Accurate, and Robust Projector-Camera Calibration", Second International Conference on 3D Imaging, Modeling, Processing, Visualization & Transmission, D. Moreno and G. Taubin for description of the projector-camera calibration tool. In addition, reference may be made to the service provided by Open CV, Open Source Computer Vision Library (http://opencv.org/), 2017 for description of the camera calibration tool.

The processor PSR is responsible for performing computations in a projector calibration method, and the processor PSR is, for example, a micro-controller, an embedded controller, a central processing unit (CPU) or a similar device, or a digital signal processor (DSP), a programmable controller, an application specific integrated circuit (ASIC), a programmable logic device (PLD), another similar device, or a combination of these devices, and the invention is not limited thereto. In some embodiments, the processor PSR may be implemented with a personal computer. In other embodiments, the processor PSR may be implemented with a mobile electronic device such as a tablet computer or a smartphone, and the invention is not limited thereto. It is noted that the image output device S may be an electronic device, such as a personal computer, a tablet computer, or a smartphone above, that serves as an image source for providing images.

Figure 2:
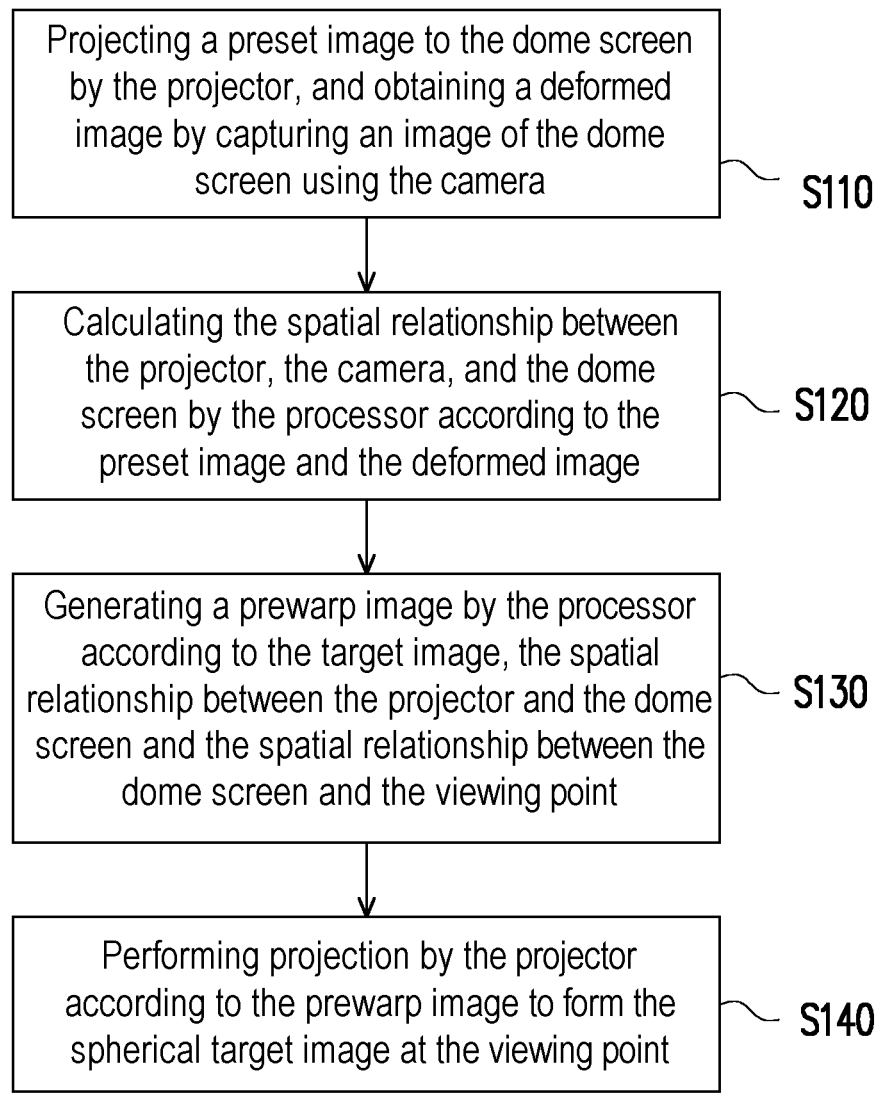
FIG. 2 is a flowchart illustrating a projector calibration method according to an embodiment of the invention.

FIG. 2 is a flowchart illustrating a projector calibration method according to an embodiment of the invention.

Referring to FIG. 2, to calibrate the target image projected by the projector to allow the viewer to see the undeformed spherical target image on the dome screen, first, in steps S110 and S120, a spatial relationship (coordinate relationship) between the projector and the dome screen (e.g., the relative angle, the displacement position, etc. (i.e., extrinsic parameters) between the projector and the dome screen) is established by using the camera. The so-called spatial relationship is the relationship of coordinate conversion between the two devices. The spatial relationship mentioned below all refers to the relationship of coordinate conversion.

In step S110, a preset image is projected to the dome screen by the projector, and a deformed image is obtained by capturing an image of the dome screen using the camera. Specifically, the projector is made to project the preset image to the dome screen, and the camera is used to capture an image of the dome screen to obtain the deformed image corresponding to the preset image. Accordingly, the preset image and the deformed image can be used to calculate the spatial relationship (coordinate relationship) between the projector, the camera, and the dome screen.

In some embodiments, the preset image is, for example, a two-dimensional image including a plurality of control points of known two-dimensional coordinates. Each control point is different, and each control point has a different pattern. Specifically, the control point is a feature point that can be recognized by the processor PSR. On the other hand, the deformed image corresponding to the preset image includes a plurality of corresponding control points that can be recognized by the processor PSR. In other words, each corresponding control point in the deformed image corresponds to one of the control points in the preset image. In addition, the preset image may be stored in a storage device (not shown), and the storage device is, for example, a movable random access memory (RAM), read-only memory (ROM), flash memory, a similar device, or a combination of these devices. The storage device is connected to the processor PSR. Therefore, the storage device and the processor PSR are disposed together, so that the processor PSR can control the storage device to provide the preset image to at least one projector.

Figure 3A:
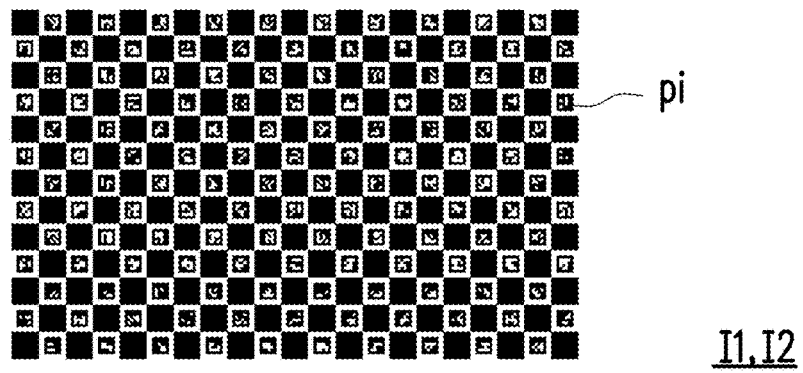
FIG. 3A is a schematic diagram illustrating a preset image according to an embodiment of the invention.
Figure 3B:
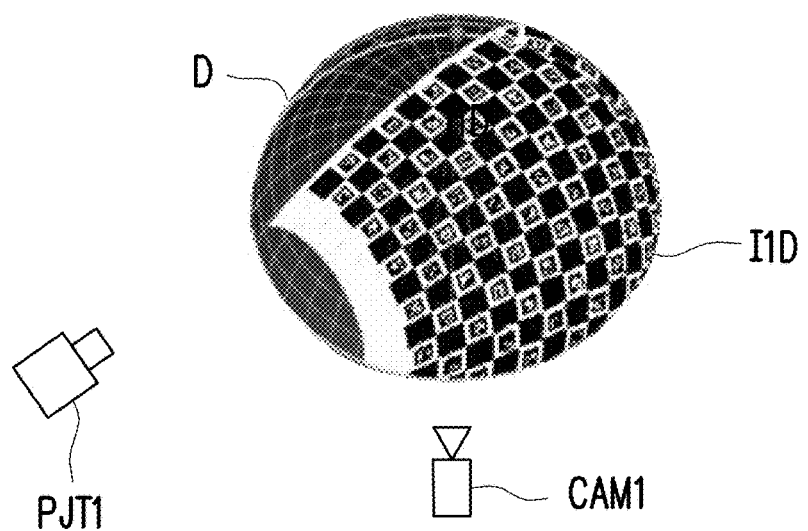
FIG. 3B is a schematic diagram illustrating a first dome screen preset image according to an embodiment of the invention.
Figure 3C:
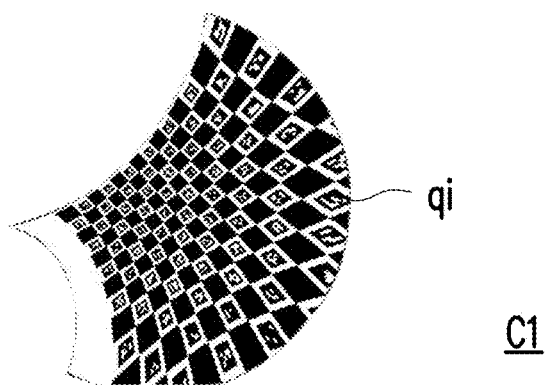
FIG. 3C is a schematic diagram illustrating a first deformed image according to an embodiment of the invention.

Referring to FIG. 3A to FIG. 3C, when the first projector PJT1 projects a first preset image I1 to the dome screen D, a first preset spherical image I1D is formed on the dome screen D. At this time, the first camera CAM1 captures an image of the dome screen D and obtains a first deformed image C1. As shown in FIG. 3A, the first preset image I1 provided by the processor PSR to the first projector PJT1 is, for example, rectangular and includes a plurality of control points pi. Each of the control points pi can be recognized by the processor PSR from the first preset image I1. After the first preset image I1 is deformed by the intrinsic parameters of the first projector PJT1, the reflection angle of the dome screen D, and the intrinsic parameters of the first camera CAM1, the first deformed image C1 captured by the first camera CAM1 is no longer rectangular. However, the processor PSR can still recognize a plurality of corresponding control points qi from the first deformed image C1 provided by the first camera CAM1. The first deformed image C1 and the first preset image I1 may be subsequently used to calculate the spatial relationship (coordinate relationship) between the first projector PJT1, the first camera CAM1, and the dome screen D.

Figure 3D:
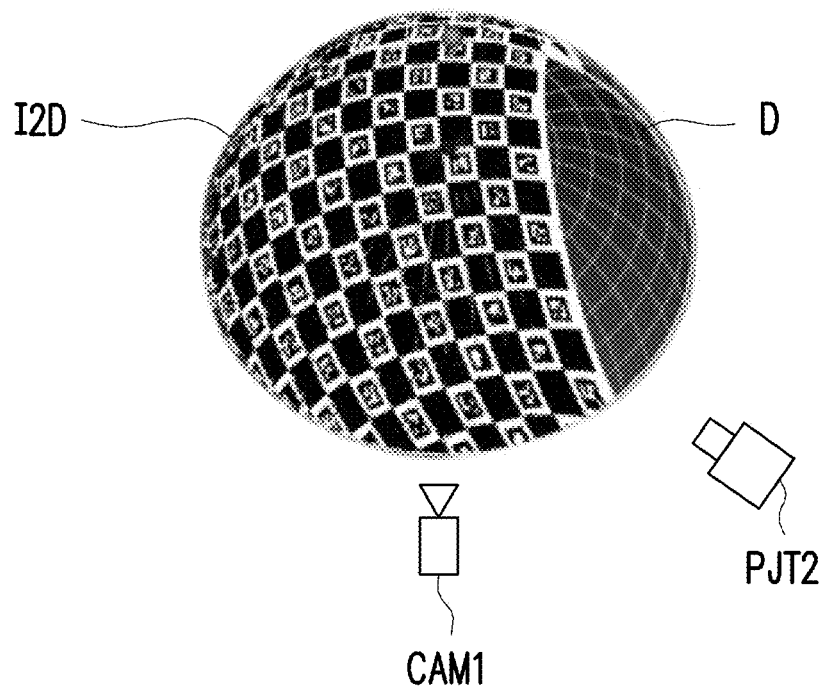
FIG. 3D is a schematic diagram illustrating a second dome screen preset image according to an embodiment of the invention.
Figure 3E:
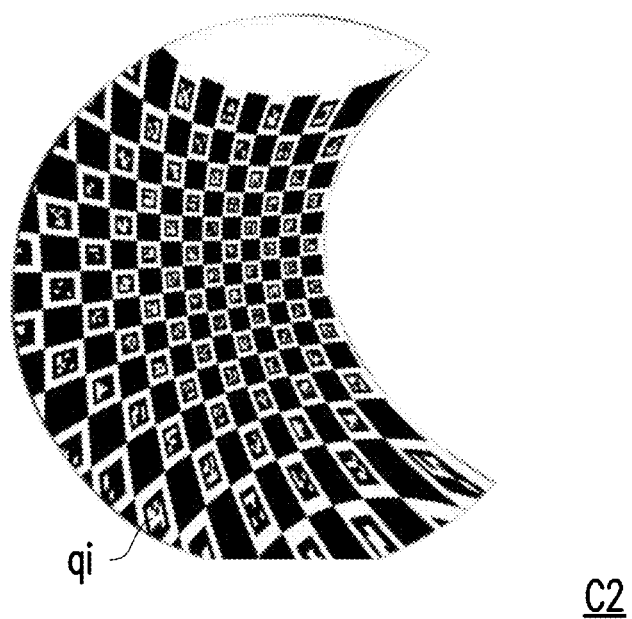
FIG. 3E is a schematic diagram illustrating a second deformed image according to an embodiment of the invention.

Referring to FIG. 3A, FIG. 3D, and FIG. 3E, when the second projector PJT2 projects a second preset image I2 to the dome screen D, a second preset spherical image I2D is formed on the dome screen D. At this time, the first camera CAM1 captures an image of the dome screen D and obtains a second deformed image C2. Similarly, the second deformed image C2 and the second preset image I2 may be subsequently used to calculate the spatial relationship between the second projector PJT2, the first camera CAM1, and the dome screen D. In particular, the second preset image I2 may be identical to or different from the first preset image I1, and the invention is not limited thereto.

In step S120, the spatial relationship between the projector, the camera, and the dome screen is calculated by the processor according to the preset image and the deformed image. The spatial relationship above includes, for example, the relative angle and the displacement between the projector and the camera, the relative angle and the displacement between the projector and the center of sphere of the dome screen, and the relative angle and the displacement between the camera and the center of sphere of the dome screen, i.e., the coordinate relationship between them.

In some embodiments, the calibration of one or more projectors may be accomplished through the same camera, as described below with reference to FIG. 3A to FIG. 3E.

First, the processor PSR performs calibration using the intrinsic parameters. Specifically, the processor PSR finds the plurality of control points pi of the first preset image I1, and converts the control points pi by using the intrinsic parameters of the first projector PJT1. In addition, the processor PSR finds the plurality of corresponding control points qi of the first deformed image C1, and recovers the corresponding control points qi by using the intrinsic parameters of the first camera CAM1.

Figure 3F:
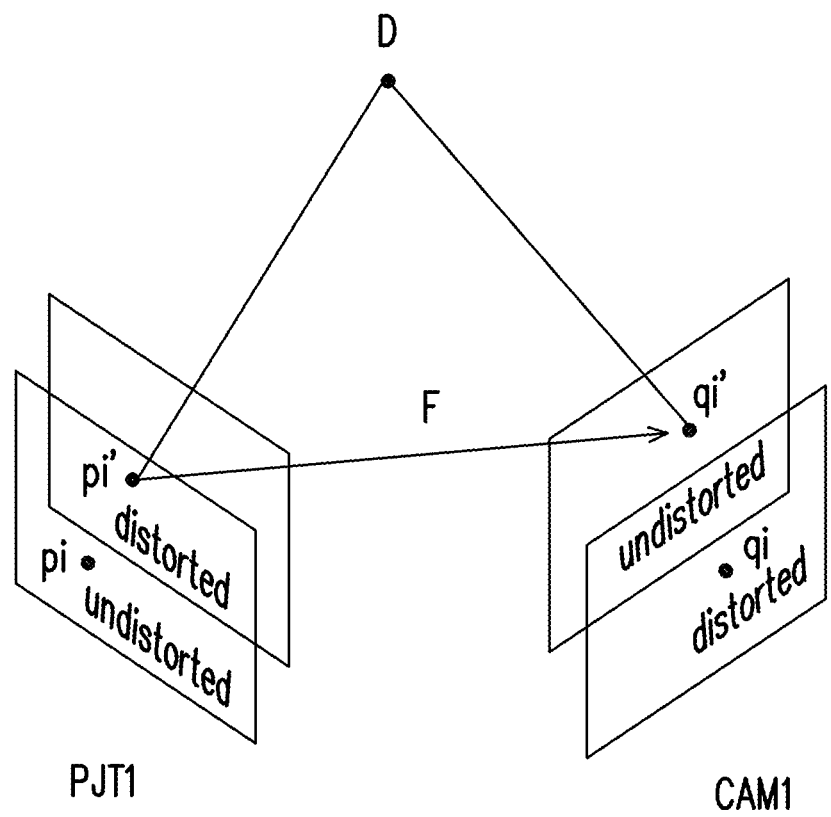
FIG. 3F illustrates a fundamental matrix between a projector and a camera according to an embodiment of the invention.

Referring to FIG. 3F, taking the first camera CAM1 as the world coordinate center, according to the converted control points pi' and the recovered corresponding control points qi', the processor PSR can calculate a fundamental matrix F between the first projector PJT1 and the first camera CAM1, and then can calculate an essential matrix E according to an equation E=KiTFKc, where Ki is an intrinsic projection matrix of the first projector PJT1, and Kc is an intrinsic projection matrix of the first camera CAM1. The relative angle and the displacement direction between the first projector PJT1 and the first camera CAM1 can be obtained by decomposing the essential matrix E between the two. Therefore, after the essential matrix E is calculated, the relative angle and the displacement direction between the first projector PJT1 and the first camera CAM1 are also obtained. It is noted that people skilled in the art can obtain descriptions of the fundamental matrix F and the essential matrix E from relevant literature, which shall not be repeatedly described here.

To obtain an absolute displacement amount between the first projector PJT1 and the first camera CAM1, the processor PSR, for example, attempts to recover the deformed control points pi' and the recovered corresponding control points qi' to a plurality of three-dimensional coordinate points in a three-dimensional space according to the relative angle and the displacement direction above by using a triangulation method, etc. Since the three-dimensional coordinate points recovered at this time should be in line with the dome screen D, the processor PSR can use the three-dimensional coordinate points to approximate an equation of sphere by using the method of least squares. Moreover, with the known radius of the dome screen D, the coordinates of the center of sphere of the dome screen D can be obtained. Furthermore, the scale of the displacement amount between the first projector PJT1 and the first camera CAM1 can be calculated to obtain the absolute displacement amount. In other words, the extrinsic parameters between the first projector PJT1 and the first camera CAM1 are obtained, and the extrinsic parameters include the absolute displacement amount.

According to the method described above, after obtaining the first preset image I1 and the first deformed image C1, the processor PSR can obtain the spatial relationship between each two of the first projector PJT1, the first camera CAM1, and the dome screen D through calculations.

In addition, in FIG. 3D, the spatial relationship between the second projector PJT2, the first camera CAM1, and the dome screen D can also be obtained by using a method similar to that described above. Accordingly, the processor PSR can obtain the spatial relationship between each two of the first projector PJT1, the second projector PJT2, and the dome screen D.

Figure 4:
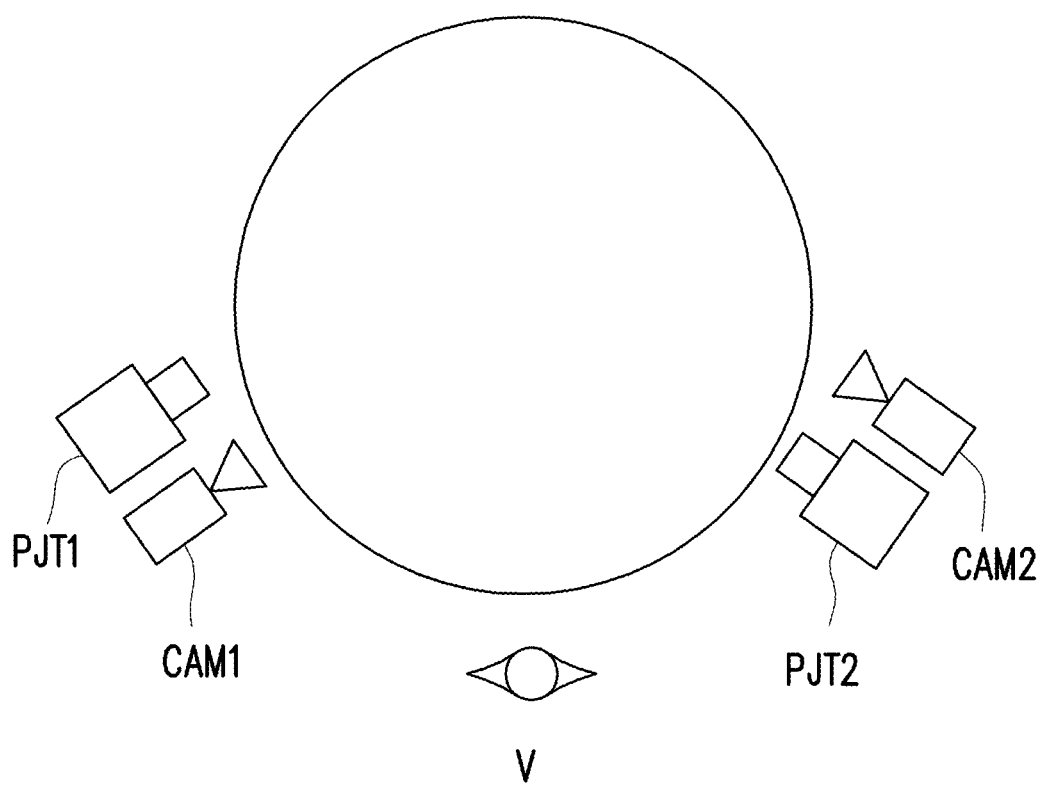
FIG. 4 is a framework schematic diagram illustrating a projection system with multiple projectors according to an embodiment of the invention.

In some embodiments, the calibration of multiple projectors may also be accomplished through multiple corresponding cameras, as described below with reference to the framework of FIG. 4. The framework of FIG. 4 is similar to the projection system PS3 in FIG. 1C.

First, by using the method described above, the processor PSR respectively obtains the spatial relationship between each two of the first projector PJT1, the first camera CAM1, and the dome screen D and the spatial relationship between each two of the second projector PJT2, the second camera CAM2, and the dome screen D. Specifically, the first projector PJT1 projects a first preset image to the dome screen D, and the first camera CAM1 captures an image of the dome screen D to obtain a first deformed image corresponding to the first preset image. According to the first preset image and the first deformed image, the processor PSR calculates the spatial relationship between each two of the first projector PJT1, the first camera CAM1, and the dome screen D. The second projector PJT2 projects a second preset image to the dome screen D, and the second camera CAM2 captures an image of the dome screen D to obtain a second deformed image corresponding to the second preset image. According to the second preset image and the second deformed image, the processor PSR calculates the spatial relationship between each two of the second projector PJT2, the second camera CAM2, and the dome screen D.

Next, the processor PSR calculates the spatial relationship between the first camera CAM1 and the second camera CAM2. For example, the first camera CAM1 and the second camera CAM2 may be made to simultaneously capture a third preset image displayed on the dome screen D to respectively obtain a third deformed image and a fourth deformed image. Next, by using a method similar to that described above, the processor PSR can calculate the spatial relationship between the first camera, the second camera, and the dome screen D according to the third deformed image and the fourth deformed image, namely, obtaining the spatial relationship between the first camera and the second camera. In some embodiments, the third preset image is generated by, for example, the first projector PJT1 or the second projector PJT2, is generated on the dome screen D in another manner, or is a pattern of the dome screen D itself, and the invention does not limit the method of generating the third preset image here.

Accordingly, after obtaining the spatial relationship between each two of the first projector PJT1, the first camera CAM1, and the dome screen D and the spatial relationship between each two of the second projector PJT2, the second camera CAM2, and the dome screen D, the processor PSR further obtains the spatial relationship between the first camera and the second camera, thereby obtaining the spatial relationship between each two of the first projector PJT1, the second projector PJT2, and the dome screen D.

After obtaining the spatial relationship between the projector and the dome screen, the processor PSR can calculate the image formed at any one viewing point after a specific image is input to the projector and is projected by the projector. Similarly, the processor PSR can also calculate the image that has to be input to the projector when the target image is wished to be formed at a particular viewing point.

In step S130, a prewarp image is generated by the processor according to the target image, the spatial relationship between the projector and the dome screen and the spatial relationship between the dome screen and the viewing point. In step S140, projection is performed by the projector according to the prewarp image to form the spherical target image at the viewing point.

In some embodiments, the spatial relationship between the dome screen and the viewing point is, for example, fixed and preset in the processor. Namely, the projection system is configured with an optimal viewing position as the viewing point. In some embodiments, the spatial relationship between the dome screen and the viewing point may be set by the viewer in advance according to his/her position. In some embodiments, the spatial relationship between the dome screen and the viewing point may also be obtained by two or more cameras using the triangulation method. In other words, as long as the processor can obtain the spatial relationship between the dome screen and the viewing point before step S130, the invention does not limit the actual spatial relationship between the dome screen and the viewing point and the method of obtaining the spatial relationship.

It is noted that, in some embodiments, it is assumed that the imaging principle of the pinhole camera model also applies to the viewer at the viewing point. Therefore, the processor sets the intrinsic parameters corresponding to the viewing point to calculate image formation of the viewing point. For example, the focal length information in the intrinsic projection matrix may be determined according to the viewing angle of the human eye, the image center information may be determined, for example, according to the size of the target image, and the lens distortion coefficient may be set to, for example, zero. In some embodiments, the intrinsic parameters corresponding to the viewing point may be, for example, preset by the processor or set by the viewer (for example, through an input device such as a remote control) according to his/her requirements at the time of viewing, and the invention is not limited thereto.

Specifically, after the spatial relationship between the dome screen and the projector is determined, the spatial relationship (coordinate relationship) of the viewer may be self-determined. For example, the spatial relationship may be self-defined virtual coordinates or may be calculated by using the spatial position of the dome screen. The optimal position of a viewing point may be set at a position at a distance L translating from a spherical center position DD (not shown) of the dome screen D towards the outside of the dome screen D. Specifically, the distance L is at least greater than or equal to sphere radius/tan(fov/2) of the dome screen D, so that the viewing range of the viewer includes the entire dome screen D, where fov represents the viewing angle of the viewer (for example, the viewing angle fov=150 degrees but is not limited thereto). If the radius of the dome screen is, for example, 1,200 mm, the distance L of the optimal position of the viewing point is at least 322 mm.

Figure 5:
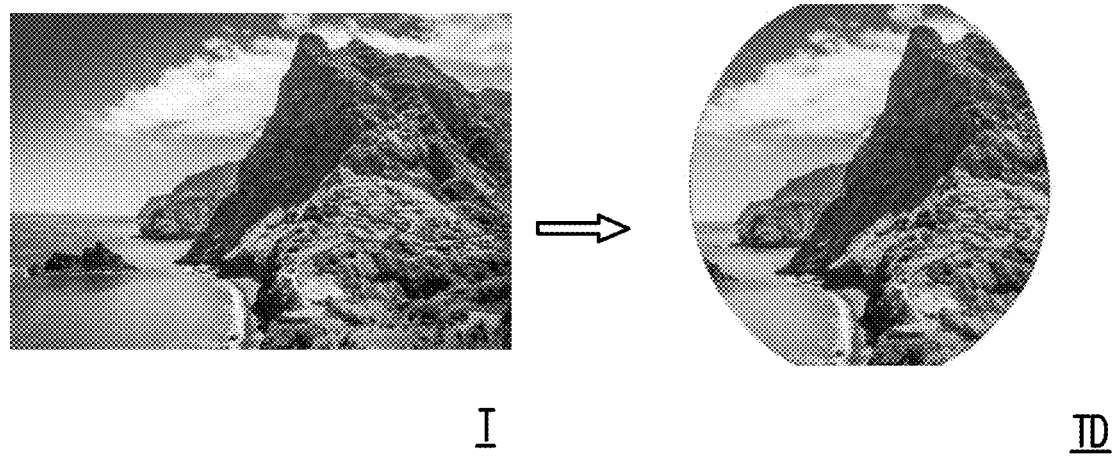
FIG. 5 is a schematic diagram illustrating a target image and a spherical target image according to an embodiment of the invention.

Referring to FIG. 5, in some embodiments, when the processor PSR is to form the spherical target image TD at the viewing point, the processor PSR first recovers the target image T by using the intrinsic parameters corresponding to the viewing point, and then calculates the spherical target image TD on the dome screen D based on the recovered target image T according to the spatial relationship between the dome screen D and the viewing point. In other words, if the image projected by the projector can form the spherical target image TD on the dome screen D, the spherical target image TD can be formed at the viewing point. In addition, the target image T is provided by the image output device S to the processor PSR.

Figure 6:
FIG. 6 is a schematic diagram illustrating a first prewarp image according to an embodiment of the invention.

First, taking the projection system PS1 with one projector as an example, the processor PSR calculates a first prewarp image W1 as shown in FIG. 6 according to the spherical target image TD, the spatial relationship between the first projector PJT1 and the dome screen D, and the intrinsic parameters of the first projector PJT1. After the processor PSR inputs the calculated first prewarp image W1 to the first projector PJT1 to have the first projector PJT1 project it, a first spherical image identical to the spherical target image TD is formed on the dome screen D. Therefore, the viewer at the viewing point can see the spherical target image TD.

Figure 7A:
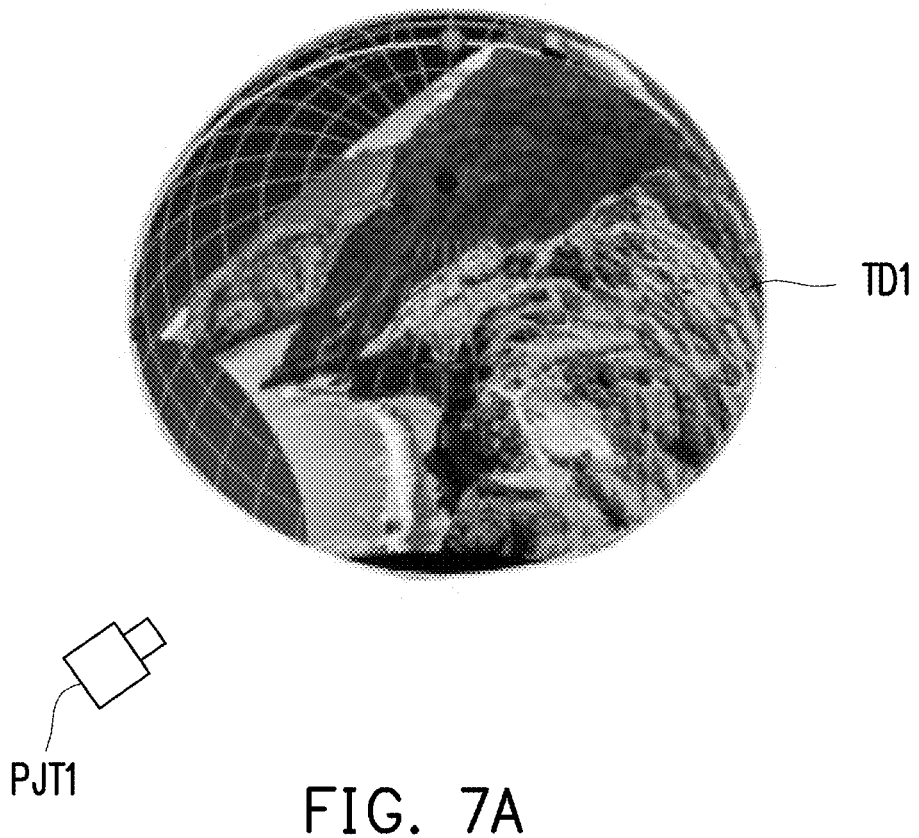
FIG. 7A is a schematic diagram illustrating a first part image according to an embodiment of the invention.
Figure 7B:
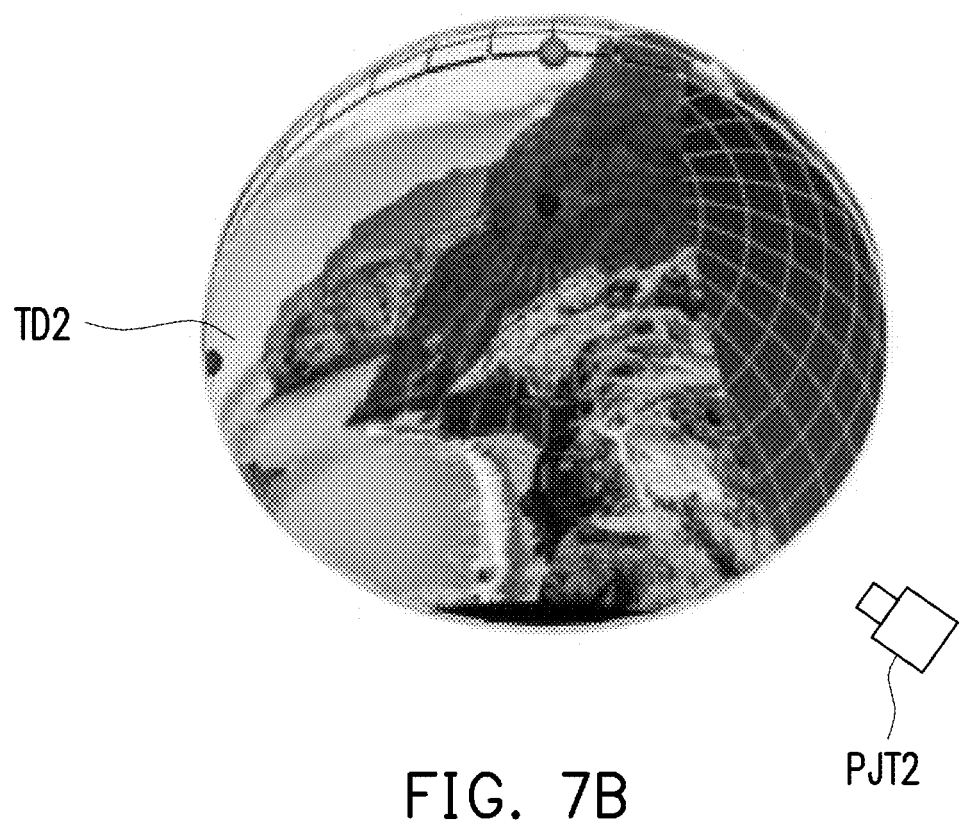
FIG. 7B is a schematic diagram illustrating a second part image according to an embodiment of the invention.

Next, taking the projection system PS2 or PS3 with multiple projectors as an example, as shown in FIG. 7A and FIG. 7B, the processor PSR first calculates a first projection range in which the first projector PJT1 can project on the dome screen according to the specification of the first projector PJT1 and the spatial relationship between the first projector PJT1 and the dome screen D, and calculates a second projection range in which the second projector PJT2 can project on the dome screen according to the specification of the second projector PJT2 and the spatial relationship between the second projector PJT2 and the dome screen D. Next, the processor PSR selects the portion of the spherical target image TD located in the first projection range as a first part image TD1, and, according to the second projection range of the second projector PJT2 on the dome screen, selects the portion of the spherical target image TD located in the second projection range as a second part image TD2.

Figure 7C:
FIG. 7C is a schematic diagram illustrating a first prewarp image according to an embodiment of the invention.
Figure 7D:
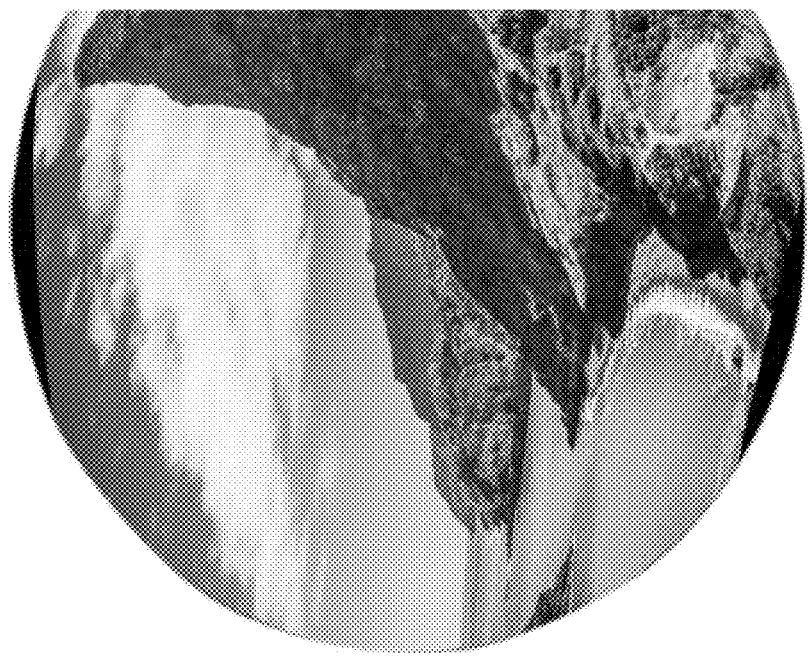
FIG. 7D is a schematic diagram illustrating a second prewarp image according to an embodiment of the invention.

Then, the processor PSR calculates a first prewarp image W1 as shown in FIG. 7C according to the first part image TD1, the spatial relationship between the first projector PJT1 and the dome screen D, and the intrinsic parameters of the first projector PJT1. In addition, the processor PSR calculates a second prewarp image W2 as shown in FIG. 7D according to the second part image TD2, the spatial relationship between the second projector PJT2 and the dome screen D, and the intrinsic parameters of the second projector PJT2.

After the processor PSR inputs the calculated first prewarp image W1 to the first projector PJT1 to have the first projector PJT1 project it, a first spherical image identical to the first part image TD1 is formed on the dome screen D. After the processor PSR inputs the calculated second prewarp image W2 to the second projector PJT2 to have the second projector PJT2 project it, a second spherical image identical to the second part image TD2 is formed on the dome screen D.

In some embodiments, the first projection range of the first projector PJT1 on the dome screen D and the second projection range of the second projector PJT2 on the dome screen D have an overlap region. Therefore, the processor PSR can, for example, first adjust the brightness of the first prewarp image W1 and the second prewarp image W2, and then input the adjusted first prewarp image W1' to the first projector PJT1 to have the first projector PJT1 project it and input the adjusted second prewarp image W2' to the second projector PJT2 to have the second projector PJT2 project it. Accordingly, a synthetic spherical image identical to the spherical target image TD can be formed on the dome screen D, and the brightness of the synthetic spherical image corresponding to the overlap region is identical to the brightness of the spherical target image TD corresponding to the overlap region.

The adjustment method of the brightness of the first prewarp image W1 and the second prewarp image W2 will be described below with reference to the examples of FIG. 8 and FIG. 9. It is noted that although the brightness adjustment method to be described below is exemplified with two projectors, a similar method can also be applied to the embodiments of a projection system with more projectors.

Figure 8:
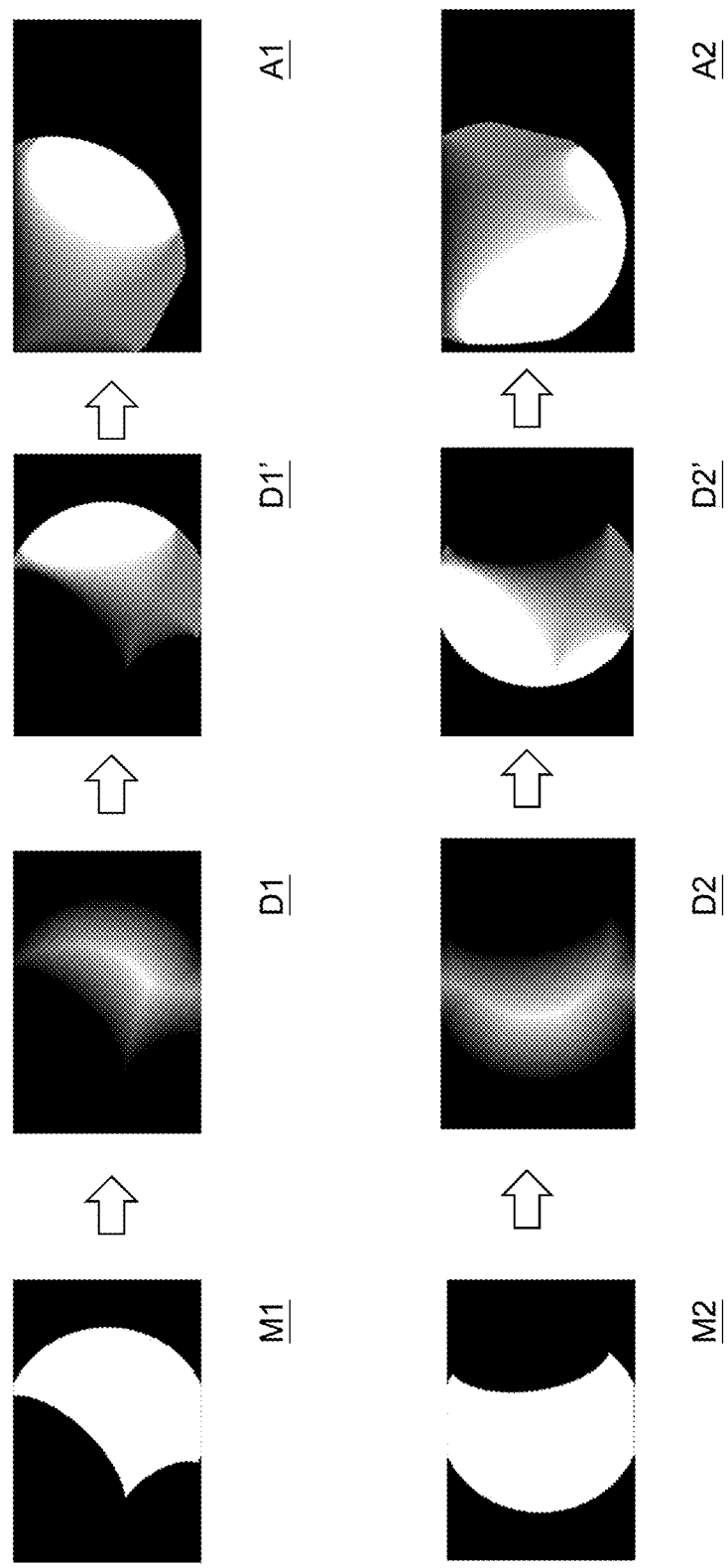
FIG. 8 is a schematic diagram illustrating a brightness calibration method according to an embodiment of the invention.

Referring to FIG. 8, taking the projection system PS2 with the first projector PJT1 and the second projector PJT2 as an example, the processor PSR first establishes a first two-dimensional mask M1 according to the first part image TD1, the spatial relationship between the viewing point and the dome screen, and the intrinsic parameters corresponding to the viewing point. The portion having the set value of 1 (white) in the first two-dimensional mask M1 represents the image region of the first part image TD1 formed at the viewing point. The portion having the set value of 0 (black) in the first two-dimensional mask M1 represents the non-image region of the first part image TD1 formed at the viewing point. Similarly, the processor PSR also establishes a second two-dimensional mask M2 according to the second part image TD2 and the spatial relationship between the viewing point and the dome screen.

Afterwards, the processor PSR performs a distance transform respectively on the first two-dimensional mask M1 and the second two-dimensional mask M2 to create a gradient effect on the boundary of the image region to obtain a first brightness mask D1 and a second brightness mask D2. Specifically, the distance transform creates the brightness gradient effect based on the distance of the position of the pixel having the set value of 1 (white) in the first two-dimensional mask M1 from the position of the pixel having the set value of 0 (black) in the first two-dimensional mask M1. Namely, as the distance of the position of pixel having the set value of 1 (white) in the first two-dimensional mask M1 from the position of pixel having the set value of 0 (black) in the first two-dimensional mask M1 increases, the brightness increases. Conversely, as the distance decreases, the brightness decreases.

After obtaining the first brightness mask D1 and the second brightness mask D2, the processor PSR normalizes the first brightness mask D1 and the second brightness mask D2 according to the following equation, for example:

$$Dj' = \frac{Dj}{\sum_{i=1}^{n} Di},$$

where n is the number of the brightness masks that are normalized. Accordingly, the processor PSR can obtain the normalized first brightness mask D1' (j=1, n=2) and the normalized second brightness mask D2' (j=2, n=2).

Then, according to a method similar to the method of converting the target image into the prewarp image as in the projection system PS1 with one projector above, the processor PSR converts the first brightness mask D1' into a first prewarp brightness mask A1 according to the spatial relationship between the first projector PJT1, the viewing point, and dome screen D. On the other hand, the processor PSR converts the second brightness mask D2' into a second prewarp brightness mask A2 according to the spatial relationship between the second projector PJT2, the viewing point, and the dome screen D.

Figure 9:
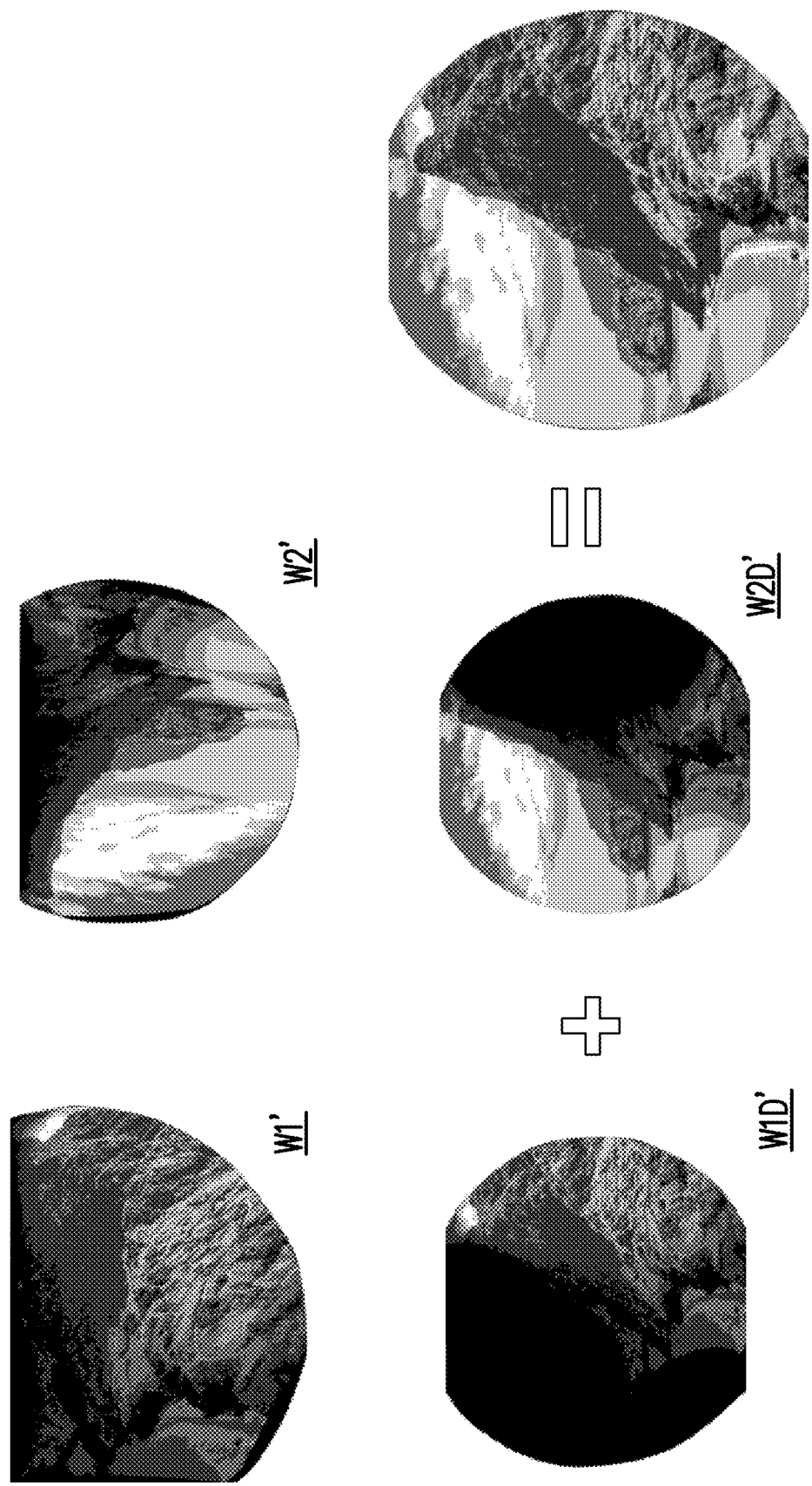
FIG. 9 is a schematic diagram illustrating adjustment of a brightness of a prewarp image according to an embodiment of the invention.

Referring to FIG. 7C, FIG. 8, and FIG. 9, the processor PSR adjusts the brightness of the first prewarp image W1 by using the first prewarp brightness mask A1 to obtain the first prewarp image W1' with the adjusted brightness. For example, the processor PSR may multiply each corresponding pixel value of the first prewarp image W1 and the first prewarp brightness mask A1 to obtain the adjusted first prewarp image W1'. Accordingly, after the first projector PJT1 projects the first prewarp image W1', a first spherical image W1D' with the adjusted brightness is formed on the dome screen D.

Referring to FIG. 7D, FIG. 8, and FIG. 9, the processor PSR adjusts the brightness of the second prewarp image W2 by using the second prewarp brightness mask A2 to obtain the second prewarp image W2' with the adjusted brightness. For example, the processor PSR may multiply each corresponding pixel value of the second prewarp image W2 and the second prewarp brightness mask A2 to obtain the adjusted second prewarp image W2'. Accordingly, after the second projector PJT2 projects the second prewarp image W2', a second spherical image W2D' with the adjusted brightness is formed on the dome screen D.

When the first projector PJT1 and the second projector PJT2 respectively project the first prewarp image W1' and the second prewarp image W2', the first prewarp image W1' and the second prewarp image W2' partially overlap with each other, and a synthetic spherical image identical to the spherical target image TD is formed on dome screen D. The spherical target image TD has uniform brightness distribution.

It is noted that, although the projector calibration method described in the embodiments above is exemplified with two projectors, a similar method may also be applied to embodiments of a projection system with more projectors. In other words, as long as corresponding cameras are present to assist in the calibration, the invention does not limit the number of the projectors in the projection system.

In summary of the above, the embodiments of the invention at least exhibit one of the advantages or effects below. Regardless of the number of the projectors, without previously learning the displacement and the angle of the projector with respect to the dome screen, the projector calibration method and the projection system using the method provided in the embodiments of the invention can calibrate the projector through the assistance of the camera to allow the viewer to see the undeformed spherical target image, which exhibits significant convenience and expandability. In addition, in the projection system with multiple projectors, the embodiments of the invention further provide the method of calibrating the brightness of each of the projectors. Even if the projection ranges of the projectors overlap, the brightness of the spherical target image can still be maintained, which thereby provides an excellent viewing experience.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projection system comprising:
    a first projector, adapted to project an image;
    a dome screen, adapted to receive the image;
    a first camera coupled to the processor, wherein the first projector projects a first preset image to the dome screen, and the first camera captures an image of the dome screen to obtain a first deformed image; and
    a processor, coupled to the first projector,
        wherein the first preset image, provided by the processor, comprises a plurality of control points, the plurality of control points have different patterns to be projected on the dome screen by the first projector, and
        wherein the processor is configured to calculate a spatial relationship between the first projector and the dome screen according to the first preset image and the first deformed image, and the spatial relationship between the first projector and the dome screen comprises a relative angle and a displacement between the projector and the center of sphere of the dome screen,
        wherein the processor is configured to calculate a spherical target image according to a target image and a spatial relationship between the dome screen and a viewing point, and generate a first prewarp image according to the spherical target image and the spatial relationship between the first projector and the dome screen,
        wherein the first projector projects the first prewarp image on the dome screen so as to form the spherical target image at the viewing point,
        wherein a distance between a position of the viewing point and a position of a center of sphere of the dome screen is at least greater than or equal to a distance of a sphere radius/tan(fov/2) of the dome screen, where fov is a viewing angle.

2. The projection system of claim 1, wherein the processor is configured to calculate a spatial relationship between the first projector, the first camera, and the dome screen according to the first preset image and the first deformed image.

3. The projection system of claim 2,
    wherein the first projector projects the first prewarp image to the dome screen to form a first spherical image on the dome screen, and the spherical target image is identical to the first spherical image.

4. The projection system of claim 2, wherein the processor is configured to:
calculate the spherical target image according to the target image, the spatial relationship between the dome screen and the viewing point, and intrinsic parameters corresponding to the viewing point.

5. The projection system of claim 1, further comprising:
a second projector, coupled to the processor, wherein the processor is configured to:
select a first part image of the spherical target image according to the spatial relationship between the first projector and the dome screen and a first projection range of the first projector; and
generate the first prewarp image according to the first part image and the spatial relationship between the first projector and the dome screen.

6. The projection system of claim 5, wherein the processor is further configured to:
select a second part image of the spherical target image according to a spatial relationship between the second projector and the dome screen and a second projection range of the second projector; and
generate a second prewarp image according to the second part image and the spatial relationship between the second projector and the dome screen, wherein the second projector performs projection according to the second prewarp image.

7. The projection system of claim 6, wherein the second projector projects a second preset image to the dome screen, and the first camera captures an image of the dome screen to obtain a second deformed image, wherein the processor is further configured to:
calculate a spatial relationship between the second projector, the first camera, and the dome screen according to the second preset image and the second deformed image.

8. The projection system of claim 6, wherein the first projection range and the second projection range comprise an overlap region on the dome screen, and the processor is further configured to:
adjust a brightness of the first prewarp image and the second prewarp image, wherein the first projector performs projection according to the adjusted first prewarp image, and the second projector performs projection according to the adjusted second prewarp image to form a synthetic spherical image on the dome screen, wherein a brightness of the synthetic spherical image corresponding to the overlap region is identical to a brightness of the spherical target image corresponding to the overlap region.

9. The projection system of claim 8, wherein the processor is configured to:
establish a first brightness mask according to the first part image and the spatial relationship between the viewing point and the dome screen, and establish a second brightness mask according to the second part image and the spatial relationship between the viewing point and the dome screen;
normalize the first brightness mask and the second brightness mask;
generate a first prewarp brightness mask according to the normalized first brightness mask and the spatial relationship between the first projector, the viewing point, and the dome screen;

generate a second prewarp brightness mask according to the normalized second brightness mask and the spatial relationship between the second projector, the viewing point, and the dome screen; and
adjust the brightness of the first prewarp image and the second prewarp image respectively by using the first prewarp brightness mask and the second prewarp brightness mask.

10. The projection system of claim 5, further comprising:
a second camera coupled to the processor, wherein the second projector projects a second preset image to the dome screen, and the second camera captures an image of the dome screen to obtain a second deformed image,
wherein the first camera captures a third preset image displayed on the dome screen to obtain a third deformed image, and the second camera captures the third preset image displayed on the dome screen to obtain a fourth deformed image, wherein the processor is further configured to:
calculate a spatial relationship between the second projector, the second camera, and the dome screen according to the second preset image and the second deformed image; and
calculate a spatial relationship between the first camera and the second camera according to the third deformed image and the fourth deformed image to obtain a spatial relationship between the first projector, the second projector, and the dome screen.

11. The projection system of claim 1, wherein the processor is configured to:
obtain a plurality of corresponding control points in the first deformed image corresponding to the plurality of control points;
calculate a relative angle and a displacement direction between the first projector and the first camera according to the plurality of control points and the plurality of corresponding control points; and
calculate a plurality of coordinate points in a three-dimensional space corresponding to the plurality of control points and the plurality of corresponding control points according to the relative angle, the displacement direction, and a known radius of the dome screen to calculate a spatial relationship between the first projector, the first camera, and the dome screen.

12. A projector calibration method for forming a spherical target image at a viewing point, the projector calibration method comprising:
projecting, by a first projector, a first preset image to a dome screen, and obtaining a first deformed image by capturing an image of the dome screen using a first camera, wherein the first preset image, provided by a processor, comprises a plurality of control points, the plurality of control points have different patterns to be projected on the dome screen by the first projector;
calculating a spatial relationship between the first projector and the dome screen according to the first preset image and the first deformed image, wherein the spatial relationship between the first projector and the dome screen comprises a relative angle and a displacement between the projector and the center of sphere of the dome screen;
calculating a spherical target image according to a target image and a spatial relationship between the dome screen and a viewing point;
generating a first prewarp image according to the spherical target image and the spatial relationship between the first projector and the dome screen; and projecting the first prewarp image on the dome screen by the first projector.

13. The projector calibration method of claim 12, wherein the first projector projects the first prewarp image to the dome screen to form a first spherical image on the dome screen, and the spherical target image is identical to the first spherical image.

14. The projector calibration method of claim 12, wherein the step of calculating the spherical target image according to the target image and the spatial relationship between the dome screen and the viewing point comprises:
    calculating the spherical target image according to the target image, the spatial relationship between the dome screen and the viewing point, and intrinsic parameters corresponding to the viewing point.

15. The projector calibration method of claim 12, wherein the step of generating the first prewarp image according to the target image, the spatial relationship between the first projector and the dome screen, and the spatial relationship between the dome screen and the viewing point comprises:
    selecting a first part image of the spherical target image according to the spatial relationship between the first projector and the dome screen and a first projection range of the first projector; and
    generating the first prewarp image according to the first part image and the spatial relationship between the first projector and the dome screen.

16. The projector calibration method of claim 15, further comprising:
    selecting a second part image of the spherical target image according to a spatial relationship between a second projector and the dome screen and a second projection range of the second projector;
    generating a second prewarp image according to the second part image and the spatial relationship between the second projector and the dome screen; and
    performing projection by the second projector according to the second prewarp image.

17. The projector calibration method of claim 16, further comprising:
    projecting, by the second projector, a second preset image to the dome screen, and obtaining a second deformed image by capturing an image of the dome screen using the first camera; and
    calculating a spatial relationship between the second projector, the first camera, and the dome screen according to the second preset image and the second deformed image.

18. The projector calibration method of claim 16, wherein the first projection range and the second projection range comprise an overlap region on the dome screen, and the projector calibration method further comprises:
    adjusting a brightness of the first prewarp image and the second prewarp image; and
    performing projection by the first projector according to the adjusted first prewarp image and performing projection by the second projector according to the adjusted second prewarp image to form a synthetic spherical image on the dome screen,
    wherein a brightness of the synthetic spherical image corresponding to the overlap region is identical to a brightness of the spherical target image corresponding to the overlap region.

19. The projector calibration method of claim 18, wherein the step of adjusting the brightness of the first prewarp image and the second prewarp image comprises:
    establishing a first brightness mask according to the first part image and the spatial relationship between the viewing point and the dome screen, and establishing a second brightness mask according to the second part image and the spatial relationship between the viewing point and the dome screen;
    normalizing the first brightness mask and the second brightness mask;
    generating a first prewarp brightness mask according to the normalized first brightness mask and the spatial relationship between the first projector, the viewing point, and the dome screen;
    generating a second prewarp brightness mask according to the normalized second brightness mask and the spatial relationship between the second projector, the viewing point, and the dome screen; and
    adjusting the brightness of the first prewarp image and the second prewarp image respectively by using the first prewarp brightness mask and the second prewarp brightness mask.

20. The projector calibration method of claim 15, further comprising:
    projecting, by a second projector, a second preset image to the dome screen, and obtaining a second deformed image by capturing an image of the dome screen using a second camera;
    calculating a spatial relationship between the second projector, the second camera, and the dome screen according to the second preset image and the second deformed image;
    capturing, by the first camera, a third preset image displayed on the dome screen to obtain a third deformed image, and capturing, by the second camera, the third preset image displayed on the dome screen to obtain a fourth deformed image; and
    calculating a spatial relationship between the first camera and the second camera according to the third deformed image and the fourth deformed image to obtain a spatial relationship between the first projector, the second projector, and the dome screen.

21. The projector calibration method of claim 12, wherein the step of calculating the spatial relationship between the first projector, the first camera, and the dome screen according to the first preset image and the first deformed image comprises:
    obtaining a plurality of corresponding control points in the first deformed image corresponding to the plurality of control points;
    calculating a relative angle and a displacement direction between the first projector and the first camera according to the plurality of control points and the plurality of corresponding control points; and
    calculating a plurality of coordinate points in a three-dimensional space corresponding to the plurality of control points and the plurality of corresponding control points according to the relative angle, the displacement direction, and a known radius of the dome screen to calculate the spatial relationship between the first projector, the first camera, and the dome screen.

* * * * *